United States Patent [19]

O'Toole et al.

[11] 4,068,623
[45] Jan. 17, 1978

[54] MAGNETIC FEED SYSTEM FOR DEVELOPER MIX

[75] Inventors: James F. O'Toole, Elmhurst; Daryl F. Osberg, Hoffman Estates, both of Ill.

[73] Assignee: Addressograph-Multigraph Corporation, Cleveland, Ohio

[21] Appl. No.: 784,967

[22] Filed: Apr. 6, 1977

Related U.S. Application Data

[63] Continuation-in-part of Ser. No. 709,963, July 30, 1976.

[51] Int. Cl.² ............... B05B 5/02; G03G 13/09
[52] U.S. Cl. .................................................. 118/658
[58] Field of Search ............... 118/653, 656, 657, 658; 355/3 DD; 428/14, 25

[56] References Cited

U.S. PATENT DOCUMENTS

| | | | |
|---|---|---|---|
| 3,572,922 | 3/1971 | Olden | 355/3 DD |
| 3,920,329 | 11/1975 | Dennie et al. | 355/3 DD |
| 3,937,181 | 2/1976 | Handa | 118/658 |
| 3,943,887 | 3/1976 | Smith | 118/656 |
| 3,977,361 | 8/1976 | Nagashima et al. | 118/656 |
| 3,981,272 | 9/1976 | Smith et al. | 118/658 |
| 3,985,099 | 10/1976 | Nagashima et al. | 118/658 |

Primary Examiner—Henry S. Jaudon
Attorney, Agent, or Firm—Ray S. Pyle

[57] ABSTRACT

Apparatus for effecting a continuous remixing of magnetic toner material for development of an electrostatic latent image wherein a plurality of magnetic developing rollers are positioned with intersecting magnetic force fields for effecting a blanket of development material extending about and between the developing rollers adjacent an electrostatic latent image bearing surface. The apparatus differs from prior practice in that two mixer rollers are positioned on obtuse angular relationship with respect to the bottom one of the development rollers, with magnetic orientation and hand of rotation such that an orbital magnetic field is created above the mixer rollers in space, lifting all magnetic toner material out of the normal sump area and causing a mixing action and metering action of the development material.

3 Claims, 5 Drawing Figures

LESS THAN 90°

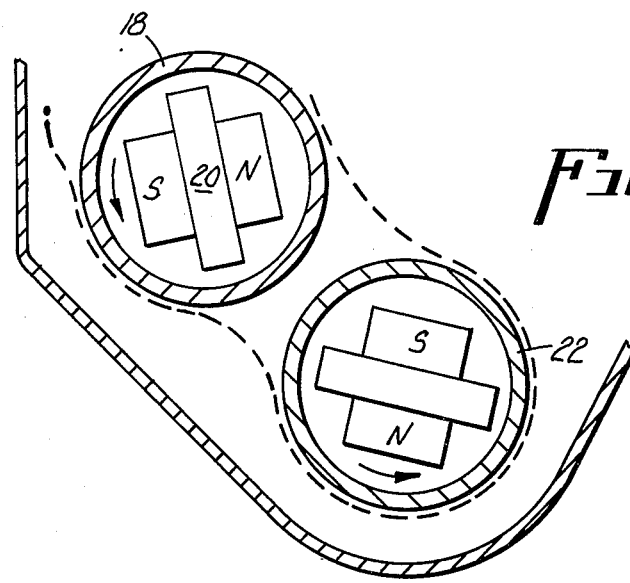
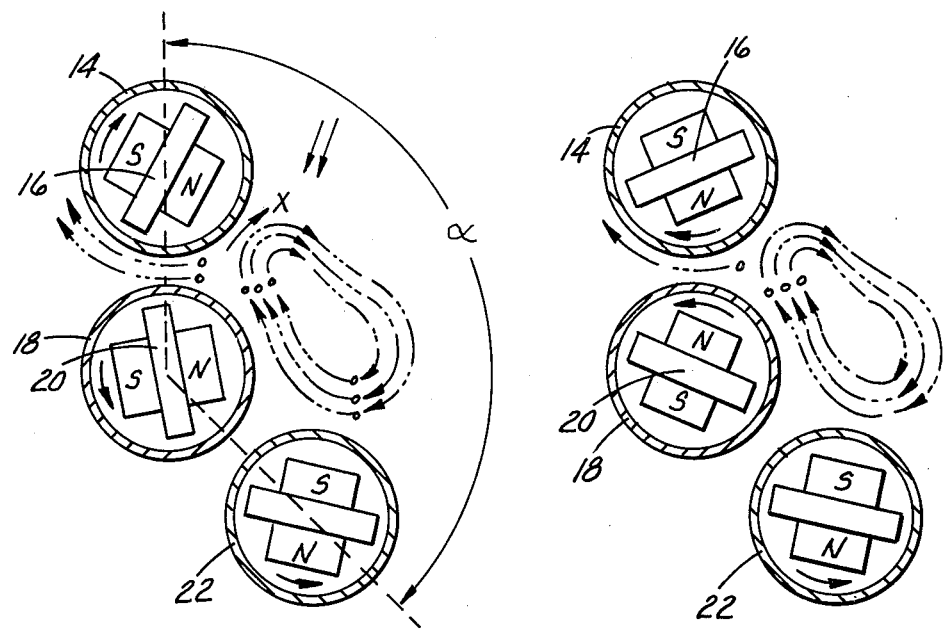

MAGNETIC FEED SYSTEM FOR DEVELOPER MIX

CROSS REFERENCE

This application is a continuation-in-part of application Ser. No. 709,963 by the present inventors, entitled "Magnetic Feed System for Developer Mix" filed July 30, 1976.

BACKGROUND OF THE INVENTION

A number of machines, illustrated by a plurality of United States patents, for example, the Thomas E. Andrako U.S. Pat. No. 3,855,969, have been developed to create an extended blanket of development material against a surface bearing an electrostatic latent image to be developed. Such development apparatus is surrounded by a housing which provides a sump into which the development material can fall and wherein mixing takes place, with fresh toner particles to replace those toner particles taken out of the magnetic mix by the image.

Unfortunately, the magnetic particles of the developer mix are very fine and are subject to mechanical abuse. If mechanical abuse reduces the nature of the magnetic material to a dust, the charge must be removed and replaced with fresh, new material.

SUMMARY OF THE INVENTION

It is an advantage of this invention that by the provision of two extra mixer rolls with magnetic orientation to create a field above the rolls in space, and a rotational surface direction of the rollers opposite the hand of the developing rollers, all of the magnetic material is lifted out of the sump into space and caused to mix in a suspended orbit free of contact with any surrounding surfaces.

It is another object to make the field between the mixing rollers and the first of the development rollers adjustable in position so that a choking effect can be established to a degree desired between the rollers and hence meter the amount of material permitted to escape the orbital mixing area and enter into the blanket developing area.

Another object of the invention is to eliminate a troublesome and costly elevator system otherwise necessary to scoop material from the sump to the developer area.

DESCRIPTION OF THE DRAWINGS

FIG. 2 is a detail enlargement of the mixer part of the apparatus;

FIG. 3 is a schematic illustration of the mixer cylinders and pattern of particle movement with the magnetic orientation of the top roller and middle mixer cylinder being open to admit maximum blanket material into the system; and FIG. 4 illustrates the three-roll mixer system at a maximum choke position to reduce to a minimum the amount of blanket material admitted into the blanket system.

DESCRIPTION OF THE PREFERRED EMBODIMENT

The electrostatic copy art is so thoroughly known that no effort is made to illustrate a complete working machine. There are many issued patents and technical journals which completely illustrate such systems if reference is needed. As in all electrostatic systems of the type under consideration, a light image of an original to be reproduced is projected onto the sensitized surface of a plate, whether that plate is a metal plate for later transfer of an image or a paper plate having a photoconductive insulating surface. It is immaterial to this invention which plate is used. An electrostatic latent image is formed on that plate. Thereafter, the latent image is developed with oppositely charged toner particles from a developing material which forms a powder image, corresponding to the latent image on the plate surface. The powder image is then electrostatically fused either directly upon the surface where created, or transferred to a carrier upon which it is to be permanently affixed.

The electrostatically attractable developing material commonly used in magnetic brush developing apparatus comprises a pigmented resinous powder referred to as "toner" and a "carrier" of larger particles removed in the triboelectric series from the toner so that a triboelectric charge is generated between the toner powder and carrier. The carrier is magnetizable, and is commonly referred to as a magnetic material. The carrier should have high magnetic permeability and low rememberance. The carrier also provides mechanical control for the formation of the brush bristles by virtue of magnetic fields so that the toner can be readily handled and brought into contact with the exposed surface. The toner is then electrostatically attracted to the electrostatic latent image from the carrier bristles to produce a visible powder image on an insulating surface.

Figure 1:
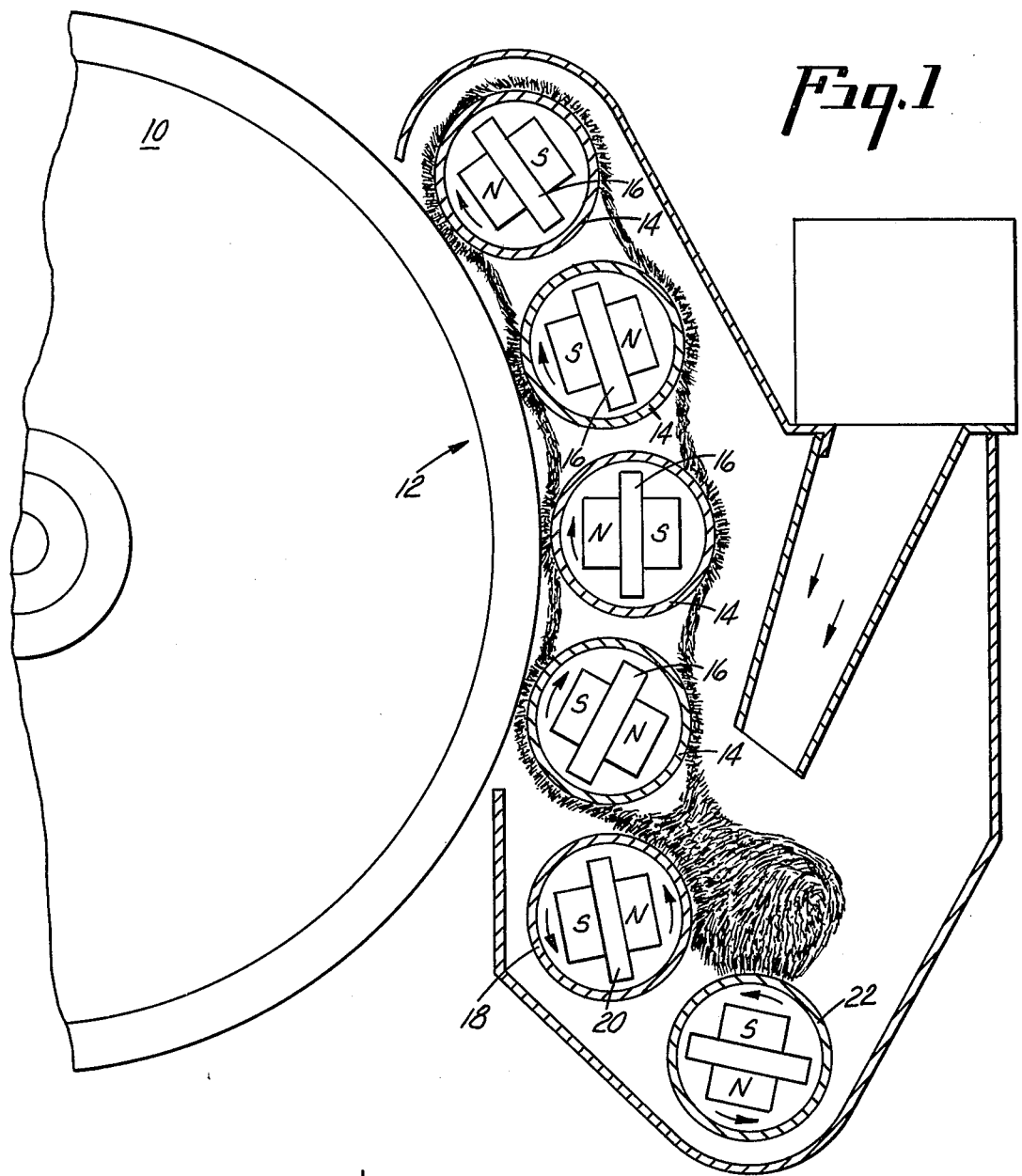
FIG. 1 is a mechanical schematic of a xerographic reproducing machine utilizing the present invention.
Figure 1A:
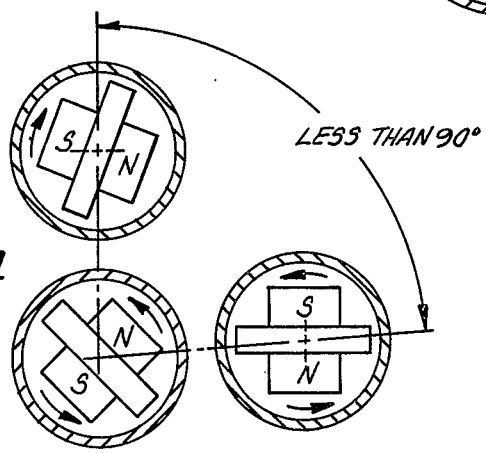
FIG. 1A illustrates an alternate angular relationship of the mix rollers.

FIG. 1 illustrates a substantially familiar arrangement of an electrostatic toning apparatus wherein there is a drum 10 which represents a photoconductive metal drum or the carriage for a sheet of photoconductive paper, for example.

The illustrated apparatus includes a four-roller development station 12. The individual rollers of the station are substantially conventional in form and comprise non-magnetic rollers 14 which are driven in the same clockwise direction in the FIG. 1 by a drive mechanism consisting of gears or chain driven sprockets, for example, but which are not illustrated in this drawing. The direction of rotation is indicated by arrows within the circles representing the rollers in FIG. 1.

Each of the rollers 14 is provided internally with a magnetic system 16 of essentially conventional general arrangment wherein the magnets are arranged in opposite polarity from adjoining rollers in the top four blanket rollers in order to establish a flux field which bridges from one magnetic system to the other. As now well-known, proper selection of size and strength of the magnet members will produce a strong flux field bridging between the adjacent surfaces of the rollers in order to accomplish a standing and turning brush moving upwardly along the surface of the drum 10 under the driving force of the rotating rollers.

In prior art structures, the mix when it reaches the top roller is skimmed away by a doctor blade and dropped into a sump for mixing and replenishing of carrier. Another concept as shown by the Andrako U.S. Pat. No. 3,855,969, is to allow the material to proceed down the back of the rollers in the same manner as it proceeded up the front in the development action, and to add extra material on the back side away from the development surface, and to skim away the excess from the bottom roll before it proceeds again up the development front face. The excess material again is caused to fall into the sump where it is mixed and replenished.

Sump mixing and collecting of material has been found to be detrimental in creating early deterioration of the carrier particles as described.

This invention has created a remarkable unique solution to the mechanical abrasion problem by producing a sumpless magnetic brush apparatus for mixing and applying the development material. Although the FIG. 1 illustrates four rollers to produce a long development brush, the number of development rollers is not the thrust of this invention. Hence, hereafter only the lowermost of the rollers will be shown and considered, and reference to the development system will refer only to that one roller. Note that the magnetic means within the development roller has a north and south pole on an axis extending in a generally normal direction to a tangent plane at the intersection of that axis and the surface being developed. The pole at the surface being developed is referred to as being inboard and the opposite pole outboard. These designations are arbitrary for convenience only. To construct this embodiment of the invention, a first mixer cylinder 18 is mounted adjacent the brush roller 14 with the axis of rotation thereof substantially parallel to the axis of rotation of the brush roller 14. That is, the surfaces are uniformly spaced. The spacing between the rollers is set at a distance equal to the maximum depth of toner mix desired for the toner blanket proceeding upwardly along the series of developer rollers. Also, technically there are only two mixer cylinders. One of the three shown serves the double duty as the first of the developer rollers. A series of mixer rollers beyond the two illustrated could be used to cradle an even bigger mixing mass, but the two mixer and one developer roll system is sufficient.

A magnetic system, referred to as a magnetic means 20, provides a north and south pole in the first mixer cylinder 18 with the poles positioned to place the pole of the cylinder 18 which lies outboard and the outboard pole of the brush roller 14 in the same polarity to thereby create a flux pattern dividing the flux of the mixer cylinder to create a projecting pattern of some of the roller pole magnetic flux and the mixer cylinder pole flux outboard, and some of the flux in a blanket flow pattern to the inboard pole of the brush roller 14.

This rather complex statement may best be understood by reference to FIG. 3. Here the bottom roller 14, the first mixer cylinder 18, and a second mixer cylinder 22 are set apart from the supporting structure. These three members lie in a pattern wherein a line connecting their centers of rotation describes an angle α of less than 180° with one branch lying generally upwardly in the path of the development roller and the middle roller 18 being the apex of the angle. The magnetic means of each of these rollers and cylinders, whether of one bar magnet, or preferably a balanced complex magnetic system, establishes a north and south pole pattern on an axis transverse the center of rotation of each of these cylinders and rollers.

The axes of the magnetic means converge in a mix area in space within the defined angle. If more mixer cylinders were used, they would lie in a curved path with the axes fulfilling that definition. Note that the development cylinders are referred to as rollers whereas the mixing cylinders are referred to as cylinders simply for differentation purposes.

The selection of the angular relationship of the cylinders and rollers that produce the suspended mixing action may vary within wide range depending upon the strength of the magnets employed and the empirical decision as to the best mixing action obtainable with a particular mix. The point of the invention is that the magnetic fields are established to cooperate with one another in suspending the toner mix rather than to allow it to be mechanically tumbled and mixed within a sump. The foregoing description has shown the preferred embodiment of an obtuse angle, but a far more compact and elevated mixing area is created if the roller 22 is moved to an acute angular position. Furthermore, an obtuse angle can extend up to 180°, but at such an extended straight line relationship, the real mixing action is virtually lost and hence not to be desired. Again, however, no exact limits need be set because each machine design will require somewhat different angular relationship and with the guide lines given above that relationship can be readily obtained. Hence, it may be properly stated that the angular relationship is something less than 180° in order to accurately define a working relationship.

The construction of these cylindrical devices is essentially identical. In the three-part arrangement as shown, the top roller 14 and the apex cylinder 18 have the magnetic polar orientation in the same direction generally speaking, and they turn in opposite hands. The roller 14 is shown turning in a clockwise direction whereas the cylinder 18 is turning in a counterclockwise direction. Finally, the third cylinder, which has been referred to as mixing cylinder 22, turns in the hand of its adjacent roller, namely counterclockwise but it has an opposite polar orientation.

The result of the rotational directions and polar orientation is that a particle of carrier and toner which may be traced beginning at the surface of mixer cylinder 22, moves along the cylinder 22 to a point where the field departs from the surface. The particle follows along the bridging field to the cylinder 18. Upon passing across the pole of the cylinder 18 the particle is restricted from moving between the cylinder 18 and the roller 14 to a certain degree by opposing magnetic fields and the compressing of the material bulk by the roll spacing. There is a physical urge of the particles to move between roll 14 and cylinder 18, but the magnetic forces of the opposing north poles will tend to drive the particle in the direction X. There are three lines of particles to indicate a greater physical mass than the two which escape between the roller and cylinder. Those particles which are not able to find the way between the two members are picked up by the weak field which results from the conflict between the two north poles, and the particle is guided by the weak field of the roller 14 to return to the cylinder 22 as suggested by the curved three lines. The physical movement is caused by pressure of other particles being forced to the conjuncture of the fields from the roller 14 and the cylinder 18 by the turning cylinder 22. When the particle then reaches the starting point it begins its circular path once again.

The highly desirable result which has been obtained by this orientation of rollers and magnets is that the orbital path of the mix described takes place suspended in space entirely out of contact with any buckets or scoops or mixing paddles required by the prior art that cause mechanical wear of the mix.

The FIG. 4 is provided to illustrate a capability of this invention to meter the thickness of the blanket proceeding up the development roll series, and to magnetically strip the downwardly moving blanket from the back side of the rollers into the mixing area.

The magnetic means within the roller 14 and cylinder 18 are adjustable within a range which is determined by magnet type, strength, and configuration, as well as roll spacing and material composition. The polar magnets in magnetic brush developers are carried by side plates, and are rotationally adjustable to produce the best brush pattern. That known structure is used in this invention in a new and desirable way to work in conjunction with the suspended mixing mass to meter the blanket flow.

The range is determined by the results sought. First, it must be understood that the placement of the magnetic means of roll 14 and cylinder 18 with the like poles outboard will create a null line which will be somewhat like a vector between the opposing forces. Hence, the null line will point to the mix area, and as the blanket of developer mix proceeds downwardly to the null line it will strip away from roll 14 and enter the mixing mass. No mechanical doctor blade is required.

Some of the toner particles will tend to cling directly to the point of the rollers where the magnetic force emerges. With the magnetic means positioned as shown in FIG. 3, the amount of restriction due to the clinging particles is relatively minor and metering is limited only by the physical distance of the two rollers and cylinders. However, when oriented as shown in FIG. 4, a clogging and magnetic force interference takes place which limits the amount of material able to pass. In FIG. 3 two lines indicate a greater blanket escaping than the single line in FIG. 4.

This apparatus has proven the effectiveness of greatly extended development mix life in all phases of testing and use, and represents a significant advancement in the art of mixing, replenishing, and supplying of a development mix for developing electrostatic latent images in an electrostatic machine.

The acute angular relationship of the axes in FIG. 3 represents the relationship which will exist in most designs when maximum blanket passage and proper null line doctor stripping are available. When moved to about the obtuse angle relationship of FIG. 4, the blanket will be essentially fully closed off. Hence, FIG. 4 represents an extreme limit beyond a practical limit.

What is claimed is:

1. A sumpless magnetic brush apparatus for mixing and applying developing material to electrostatic images in an electrostatic printing machine of the type utilizing a moving photoreceptor surface, comprising at least one magnetic developing brush roller with an internal magnetic means for establishing a north and south pole on an axis extending in a generally normal direction to a tangent plane at the intersection of said axis and the surface being developed, said pole at the surface being inboard, and the opposite pole being outboard, said roller having a periphery upon which bristles of magnetic developing material are adapted to be formed;

a first mixer cylinder mounted adjacent to said brush roller with the axis thereof substantially parallel said brush roller, and with the surface thereof spaced from said brush roller a distance equal to the maximum depth of toner mix desired for said toner blanket;

magnetic means for establishing a north and south pole in the first mixer cylinder with the poles positioned to place the pole of the first mixer cylinder which lies outboard and the outboard pole of the brush roller in the same polarity to thereby create a flux pattern dividing the flux of the mixer cylinder to create a projecting pattern of the roller pole and mixer cylinder outboard and a blanket flow pattern to the inboard pole of the brush roller;

a second mixer cylinder mounted adjacent said first mixer cylinder, with means for establishing a north and south pole opposite to said first mixer cylinder with a flow flux pattern bridging the cylinders in a generally tangential direction; and means to turn said developer brush roller in a direction to impel toner mix from the mixer cylinders along said surface being developed, and the mixer cylinders in the opposite direction.

2. A mixer for dispersing toner particles throughout a magnetic carrier, comprising:

three rollers lying in a pattern wherein a line connecting the centers of rotation describes an angle less than 180° with one branch being generally upwardly and the middle roller being the apex roller;

magnetic means in each roller establishing a north and south pole pattern on an axis transverse said roller center of rotation, said axis of the magnetic means converging in a mix area embraced within said obtuse angle above the gravitationally lowermost of said rollers, the top and apex rollers having the magnetic polar orientation in the same direction and turning in opposite hands, and the third roller turning in the hand of its adjacent roller and having an opposite polar orientation.

3. The mixer defined in claim 2, wherein the axis of said magnetic means of the top and apex rollers is adjustable within a range from an acute angular relationship up to a straight angle with like poles opposed.

* * * * *